Patented May 11, 1943

2,318,796

UNITED STATES PATENT OFFICE 2,318,796

METHOD OF MAKING RETRACTILE ARTICLES

René Picard and René Fays, Paris, France; vested in the Alien Property Custodian No Drawing. Application filed August 15, 1939, Serial No. 290,310. In France February 13, 1939

3 Claims. (Cl. 18—57)

This invention relates to retractile articles such as caps, bands and the like, and more particularly to a method of making retractile articles.

In our application Serial No. 290,309 filed on even date herewith, there is described a process of manufacturing extensible, retractile articles formed of a water-insoluble cellulose derivative. According to the method set forth in said copending application, appropriate molds are immersed in solutions of the cellulose derivatives and upon withdrawal of said mold a layer of solution adheres thereto. The adhering layer of solution is coagulated by means of water or dilute acids. Where acetic acid solutions of triacetate of cellulose constitute the molding solutions, the coagulation is effected by means of water or dilute acetic acid. After complete coagulation, the articles are thoroughly washed, rinsed, cut to the desired length if desired, and removed from the molds. The articles removed from the molds, and while still in the gel state, are impregnated as by immersion in an aqueous solution containing a plasticizer, said plasticizer being a solvent or swelling agent for the cellulose derivative, miscible with water in large proportions, and sufficiently volatile to be largely eliminated during the drying of the article.

We have now found that, if in the cellulose derivative solution which is to be formed into the retractile article there is incorporated an appropriate solvent and the said solution after molding is coagulated in a more dilute aqueous solution containing the same solvent as the one incorporated in the molding solution, we can obtain retractile articles such as caps, bands, etc. which have sufficient plasticity and extensibility to permit said articles to be stretched while in the moist or gel state.

The nature and objects of the instant invention will become clear from the following description and appended claims.

In accordance with the principles of the instant invention, there is produced a molding solution of a water-insoluble cellulose derivative containing a solvent of the type hereinafter more fully explained, and also preferably 20%-30% of water. Appropriate molds are immersed in the previously described solution and a layer thereof adheres to the molds upon withdrawal thereof. The adhering layer of solution is then coagulated by means of a solution containing the same solvent as utilized in the molding solution but in a more dilute concentration. Specifically, the coagulating solution is characterized in that it contains from 60%-90% of water. After complete coagulation, the article while still on the mold is cut to desired lengths, if desired, after which it is stripped therefrom, the excess solution removed, and then finally wrapped or packaged in impermeable containers. Sufficient solvent remains in the moist or gel article to impart sufficient plasticity and extensibility to permit stretching thereof.

The solvent which is employed in the molding solution and in the coagulating bath is characterized in that it is miscible with water in large proportions and also sufficiently volatile to be largely eliminated during drying.

Derivatives of polyhydric alcohols, and particularly derivatives of glycols and glycerols may be mentioned as solvents which have produced satisfactory results.

As derivatives of glycol which have given satisfactory results may be mentioned those having the following general formula

wherein:

X is a radical of glycol;
R is a radical of a lower fatty acid and a halogen;
R' is a hydroxyl group, a radical of a lower fatty acid, or an alkoxyl radical containing 1 to 2 C atoms.

As derivatives of glycerol which have given satisfactory results may be mentioned those having the following general formula:

wherein:

Y is a radical of glycerol;
$R^2$ is a radical of a lower fatty acid or a halogen;
$R^3$ is a hydroxyl group, a radical of a lower fatty acid, or an alkoxyl radical containing 1 to 2 C atoms;
$R^4$ is a hydroxyl group, a radical of a lower fatty acid, or an alkoxyl radical containing 1 to 2 C atoms.

As specific illustrative examples of derivatives of glycols which have given satisfactory results may be mentioned monoformate of glycol, monoacetate of glycol, triacetate of glycol, and monochlorhydrin of glycol.

As specific illustrative examples of derivatives of glycerols which have given satisfactory results may be mentioned glycerol monoacetate, glycerol diacetate, glycerol triacetate, and glycerol monochlorhydrin.

It is to be understood that one or a plurality of the glycol derivatives or one or a plurality of the glycerol derivatives, or combination of both the derivatives of glycol and the derivatives of glycerol may be used.

It is to be noted that the solvent mixtures and the coagulating bath employed in this invention are neutral, stable and non-corrosive. For this reason, the aforementioned solvents are economical for use in actual operation.

If desired, various resins may be associated with the cellulose derivatives. This is of special advantage with regard to acetic acid solutions.

The products obtained by the instant invention offer high resistance to elastic elongation during the positioning in place of the retractile articles. The gel is less swollen and therefore contraction in drying without tension is somewhat less than in the products obtained when the gel retractile article is treated in a plasticizing bath. The extensibility and resistance after drying are of the same order as the products obtained by the treatment of the gel products with a plasticizing solution.

In order to more clearly explain the invention, there is hereinafter set forth a specific example which it is to be understood is in no wise limitative of the invention:

*Example.*—A suitable quantity of triacetate of cellulose is dissolved in a mixture of 60%—70% of monochlorhydrin of glycol, 20%—30% of water and 3%—6% of triacetin to form a solution containing approximately 10% of the triacetate. An appropriate glass mold is introduced into the solution and upon withdrawal a layer of the solution adheres thereto. The solution, while on the mold, is then coagulated at room temperature by means of a coagulating solution consisting of 20%—25% of monochlorhydrin of glycol, 70%—75% of water and 4%—6% of triacetin. The coagulated articles are preferably then appropriately treated to remove the solution adhering to the surface thereof, after which they are removed from the molds and wrapped while still moist in impermeable containers, for example boxes. The proportions are by weight.

Since it is obvious that various changes and modifications may be made in the above description without departing from the nature or spirit thereof, this invention is not restricted thereto except as set forth in the appended claims.

We claim:

1. The method of making retractile articles, such as caps and bands, having sufficient plasticity and extensibility in the moist or gel state to permit stretching thereof, which comprises molding a solution of a water-insoluble cellulose acetate containing water and a solvent for said cellulose acetate comprising a water-miscible derivative of a polyhydric alcohol into the desired shape or form, the proportions of water and said solvent being such as to maintain said cellulose acetate in solution, coagulating said solution while in said shape or form with a coagulating bath comprising an aqueous solution containing the same cellulose acetate solvent used in the molding solution, the concentration of the water in the coagulating bath being greater than the concentration of the water in the molding solution and sufficient to coagulate said cellulose acetate, and maintaining said molded article in the moist or gel state until at least said article is positioned in place in the ultimate use thereof.

2. The method of making retractile articles, such as caps and bands, having sufficient plasticity and extensibility in the moist or gel state to permit stretching thereof, which comprises molding a solution of a water-insoluble cellulose acetate containing a solvent for said cellulose acetate comprising a water-miscible derivative of a polyhydric alcohol and 20%–30% by weight of water into the desired shape or form, the proportions of water and said solvent being such as to maintain said cellulose acetate in solution, coagulating said solution while in said shape or form with a coagulating bath comprising an aqueous solution containing the same cellulose acetate solvent used in the molding solution, the concentration of the water in the coagulating bath being 60%–90% by weight thereof, and maintaining the said coagulated molded article in the moist or gel state until at least said article is positioned in place in the ultimate use thereof.

3. A method of making retractile articles, such as caps and bands, having sufficient plasticity and extensibility in the moist or gel state to permit stretching thereof, which comprises molding a solution of triacetate of cellulose dissolved in a mixture of 60%–70% of monochlorhydrin of glycol, 20%–30% of water, and 3%–6% of triacetin into the desired shape or form and coagulating said solution in said shape or form with a coagulating bath comprising 20%–25% of monochlorhydrin of glycol, 70%–75% of water, and 4%–6% of triacetin, and maintaining the said coagulated molded article in the moist or gel state until at least said article is positioned in place in the ultimate use thereof.

RENÉ PICARD.
RENÉ FAYS.